United States Patent
Ganley et al.

(10) Patent No.: US 8,437,937 B2
(45) Date of Patent: May 7, 2013

(54) BLENDED BRAKING MANAGEMENT IN POWERTRAIN SYSTEMS

(75) Inventors: Thomas E. Ganley, Novi, MI (US); Sean W. McGrogan, Ann Arbor, MI (US); William R. Cawthorne, Milford, MI (US); Hanne Buur, Brighton, MI (US); Alexander K. Rustoni, Oxford, MI (US); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 178 days.

(21) Appl. No.: 12/917,133

(22) Filed: Nov. 1, 2010

(65) Prior Publication Data

US 2012/0109479 A1 May 3, 2012

(51) Int. Cl.
*G06F 7/70* (2006.01)

(52) U.S. Cl.
USPC ............... 701/70; 701/22; 303/152; 903/947

(58) Field of Classification Search ............... 701/22, 701/70, 84, 87, 51, 54; 303/152, 20; 903/947; 180/65.21; 477/3, 9
See application file for complete search history.

(56) References Cited

U.S. PATENT DOCUMENTS

| 2008/0300743 | A1 | 12/2008 | Conlon et al. |
| 2009/0107745 | A1 | 4/2009 | Buur et al. |
| 2009/0111640 | A1 | 4/2009 | Buur et al. |
| 2009/0118885 | A1* | 5/2009 | Heap et al. ............... 701/22 |
| 2009/0118887 | A1 | 5/2009 | Minarcin et al. |
| 2009/0118888 | A1 | 5/2009 | Minarcin et al. |
| 2009/0118920 | A1 | 5/2009 | Heap et al. |
| 2009/0118934 | A1 | 5/2009 | Heap et al. |
| 2009/0118957 | A1 | 5/2009 | Heap et al. |

FOREIGN PATENT DOCUMENTS

| DE | 102006055799 A1 | 5/2008 |
| DE | 112008000673 A1 | 1/2010 |

* cited by examiner

*Primary Examiner* — Thomas Black
*Assistant Examiner* — Luke Huynh

(57) ABSTRACT

A method for operating a powertrain system including a torque machine coupled to a drive wheel of a vehicle includes determining a regenerative braking capacity of the powertrain system. In response to a net operator torque request including a braking torque request, a friction braking torque command to operate a friction brake system and a regenerative braking torque request for the torque machine are coincidentally generated, a torque command is generated for controlling operation of the torque machine in response to the regenerative braking torque request, and the friction braking torque command is adjusted by an amount corresponding to a difference between the braking torque request and the regenerative braking torque request.

17 Claims, 3 Drawing Sheets

US 8,437,937 B2

BLENDED BRAKING MANAGEMENT IN POWERTRAIN SYSTEMS

TECHNICAL FIELD

This disclosure is related to blended braking systems associated with powertrain systems using torque machines.

BACKGROUND

The statements in this section merely provide background information related to the present disclosure and may not constitute prior art.

Known powertrain architectures employ one or more torque generator(s) to generate and transfer torque to a driveline including one or more drive wheels for traction to propel a vehicle. Torque generator(s) may include, e.g., an internal combustion engine and/or torque machine(s) powered by non-fossil fuel. Torque machines using non-fossil fuels include, e.g., stored electric energy, stored hydraulic energy, and stored pneumatic energy, to generate tractive torque. The torque machine may transform vehicle kinetic energy that is transmitted through the drive wheels to energy that is storable in an energy storage device.

Blended braking is a process for coincidentally using friction brake devices to generate friction braking torque preferably at all the vehicle wheels and using the torque machine(s) to react torque at the drive wheel(s) to decelerate the vehicle in response to operator input to a brake pedal and in some instances, an accelerator pedal. Known blended braking systems include a control system to modulate friction braking torque in response to changes in magnitude of the reactive torque generated by the torque machine(s).

SUMMARY

A method for operating a powertrain system including a torque machine coupled to a drive wheel of a vehicle includes determining a regenerative braking capacity of the powertrain system. In response to a net operator torque request including a braking torque request, a friction braking torque command to operate a friction brake system and a regenerative braking torque request for the torque machine are coincidentally generated, a torque command is generated for controlling operation of the torque machine in response to the regenerative braking torque request, and the friction braking torque command is adjusted by an amount corresponding to a difference between the braking torque request and the regenerative braking torque request.

BRIEF DESCRIPTION OF THE DRAWINGS

One or more embodiments will now be described, by way of example, with reference to the accompanying drawings, in which.

DETAILED DESCRIPTION

Figure 1:
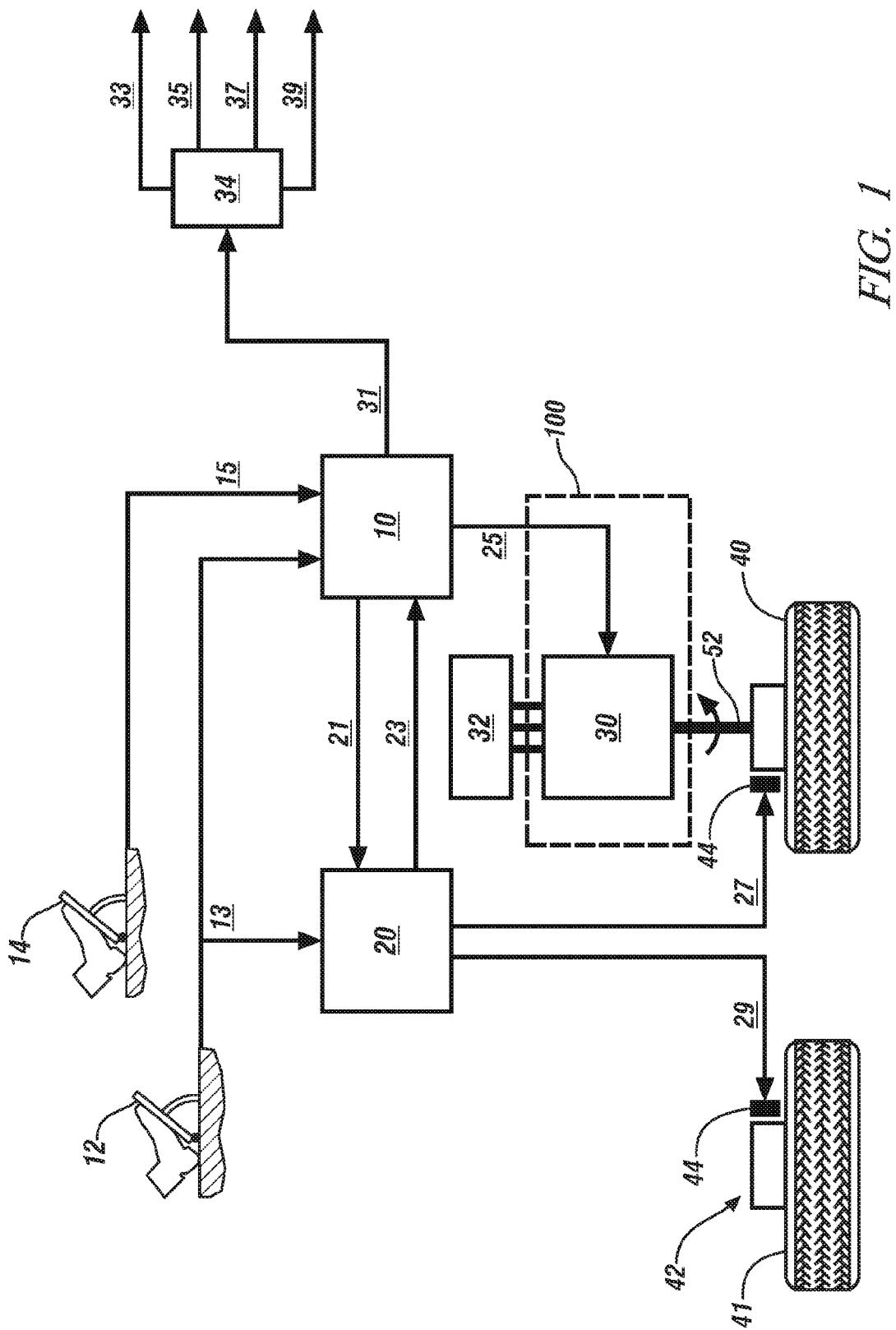
FIG. 1 is a schematic drawing of a portion of an exemplary vehicle configured to execute a blended braking control scheme, in accordance with the disclosure.

Referring now to the drawings, wherein the showings are for the purpose of illustrating certain exemplary embodiments only and not for the purpose of limiting the same, FIG. 1 schematically illustrates a portion of a vehicle 100 configured to execute a blended braking control scheme 200. Associated data signals and control signals are depicted. The vehicle 100 includes a powertrain system that includes torque-generative devices including at least one torque machine 30 that electrically couples to a power storage device 32 and mechanically couples to an output member 52 that may use a vehicle driveline to transfer torque to one or more vehicle drive wheel(s) 40. A torque machine is a torque-generative device that uses stored power to generate an output torque, and is distinguishable from a heat engine in that the torque machine generates the output torque without combusting fuel, and may operate in either a torque-generating mode or a power-generating mode. The torque machine 30 is configured to transfer torque to drive wheel(s) 40 of the vehicle 100, either directly or via a transmission and elements of the driveline. Use of the data signals and control signals to execute the blended braking control scheme 200 to cooperatively control the torque machine 30 and control friction brakes to effect vehicle braking and verify torque security is described with reference to FIGS. 2, 3, and 4. The powertrain system of the vehicle 100 may include other torque-generative devices, including, e.g., one or more other torque machines and an internal combustion engine. The output torque is a magnitude of torque generated by the torque machine 30, and is directly related to tractive torque transferred to the drive wheel(s) 40. The torque machine 30 may be employed in one of a plurality of suitable powertrain systems, including, e.g., a parallel-hybrid system, a series-hybrid system, an all-electric system, and a range-extended electric system.

In one embodiment the torque machine 30 is an electrically-powered motor/generator device, which is coupled to a power storage device 32 including a high-voltage battery system and an inverter system. The torque machine 30 may operate in a torque-generating mode to generate tractive torque for vehicle propulsion, and may operate in an electric power generating mode to react tractive torque to generate electric power that may be stored in the high-voltage battery system. It is appreciated that the torque machine 30 may instead be a mechanically-powered device, a hydraulically-powered device, or another suitable device having capabilities of generating tractive torque and reacting tractive torque, wherein the powered device is coupled to a power storage device that does not consume fossil fuel.

The control system includes a distributed control module system wherein individual control modules are configured to accomplish specific tasks. Preferably a high-level control module configured to provide overarching control and coordination of operations of the individual control modules. The control system includes a first control module (HCP) 10 configured to provide the overarching control and coordination of operations and control operation of the torque machine 30 as described herein. The HCP 10 generates a torque command 25 for controlling the torque machine 30 to operate in one of the torque-generating mode and the electric power-generating mode to either generate or react tractive torque. The vehicle 100 includes operator input devices for monitoring operator torque requests including a brake pedal 12 by which an operator imparts a braking torque request 13, and an accelerator pedal 14 by which an operator imparts an acceleration torque request 15.

The vehicle 100 includes a friction brake system 42 that is configured to apply friction braking to vehicle wheel(s) including the drive wheel(s) 40 and non-drive wheel(s) 41 to slow and/or stop the vehicle 100 in response to an operator torque request that includes the braking torque request 13. The friction brake system 42 includes a brake control module (EBCM) 20 configured to control operation of a plurality of friction wheel brakes 44 preferably connected to the drive wheel(s) 40 and the non-drive wheel(s) 41. The EBCM 20 controls operation of the friction brake system 42 by generating braking torque commands 27 and 29 that are communicated and immediately applied to the friction wheel brakes 44 at the drive wheel(s) 40 and the non-drive wheel(s) 41, respectively.

The EBCM 20 and the HCP 10 are signally linked to communicate information. The link may be accomplished using any suitable communications hardware and protocols, including, e.g., serial communications, CAN bus, wireless communications, and/or others.

The EBCM 20 preferably directly monitors the braking torque request 13 and acts thereon. The HCP 10 directly monitors the braking torque request 13 and the acceleration torque request 15, and generates a net torque request 31, which is an arithmetic combination of the braking torque request 13 and the acceleration torque request 15. As such, the EBCM 20 implements at least a portion of the blended braking control scheme 200 by modulating friction braking torque in response to changes in a magnitude of the reactive torque generated by the torque machine(s) 30.

A torque security operation 34 verifies that a combination of torque commands including the braking torque commands 27 and 29. The torque machine 30 is responsive to the net torque request 31 determined in the HCP 10 using the operator torque requests including the braking torque request 13 and the acceleration torque request 15. The torque security operation 34 may be executed by the HCP 10, or alternatively, it may be executed by another suitable control module having access to the relevant torque commands and torque data. Calculated torque commands corresponding to the torque security operation 34 include a maximum output torque (To_max) 33, a maximum output torque during regenerative braking (To_max_regen) 39, a minimum output torque (To_min) 35, and a minimum output torque during regenerative braking (To_min_regen) 37.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinatorial logic circuit(s), input/output circuit(s) and devices, appropriate signal conditioning and buffer circuitry, and other suitable components to provide the described functionality including the blended braking control scheme 200. Control modules have sets of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Figure 2:
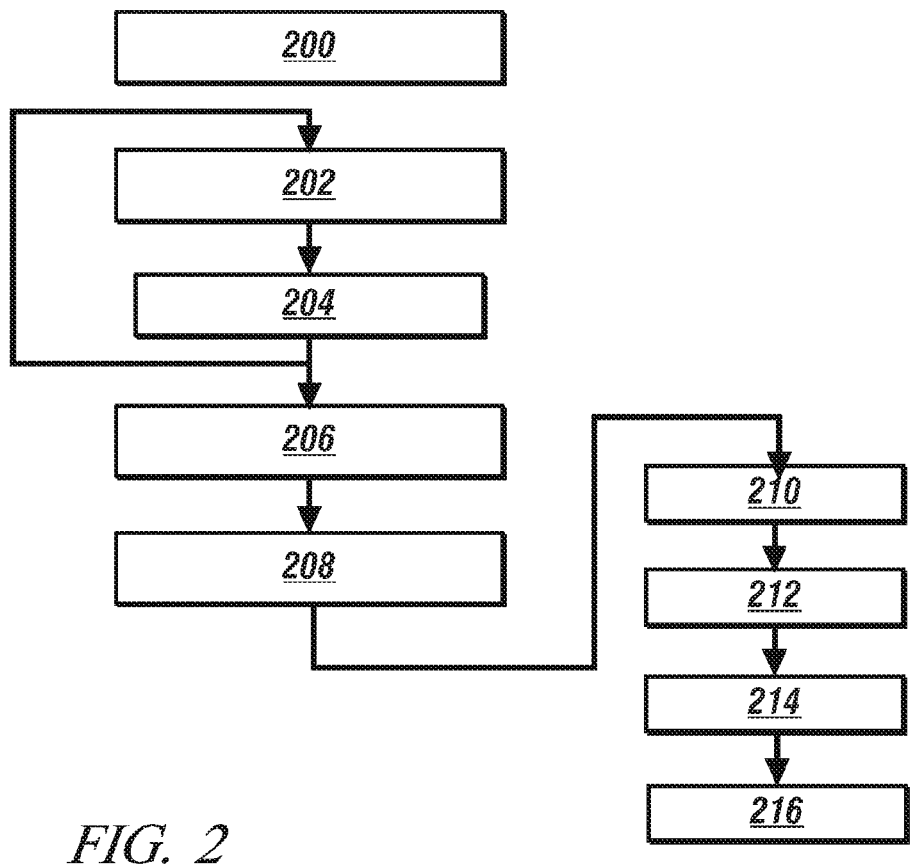
FIG. 2 is a schematic drawing of a control scheme in flowchart form for operating a powertrain system using a blended braking control scheme, in accordance with the disclosure.

FIG. 2 depicts the blended braking control scheme 200 in flowchart form. The blended braking control scheme 200 is executed to control vehicle braking in response to operator inputs by controlling brake torque applied by the friction brake system 42 and correspondingly controlling reactive torque applied by the torque machine 30, thus achieving the blended braking function by modulating friction braking torque in response to changes in a magnitude of the reactive torque generated by the torque machine(s) 30 based upon the net torque request 31, which is the combination of the braking torque request 13 and the acceleration torque request 15. This includes considerations associated with being responsive to the operator torque requests, maximizing regenerative electric power, and ensuring braking torque security. The blended braking control scheme 200 of FIG. 2 is executable in the powertrain system depicted in FIG. 1, and described with reference thereto.

Table 1 is provided as a key wherein the numerically labeled blocks and the corresponding functions associated with the blended braking control scheme 200 depicted in FIG. 2 are set forth as follows.

TABLE 1

FIG. 2

| BLOCK | BLOCK CONTENTS |
| --- | --- |
| 200 | Blended braking control scheme |
| 202 | Determine regenerative braking capacity 21 in HCP |
| 204 | Communicate regenerative braking capacity 21 from HCP to EBCM |
| 206 | Operator imparts braking torque request 13 to EBCM |
| 208 | EBCM generates friction braking commands 27 and 29 to the friction brakes 42 and 44 in response to the braking torque request 13 |
| 210 | EBCM sends regenerative braking torque request 23 to the HCP |
| 212 | HCP generates torque command 25 for controlling the torque machine in response to the regenerative braking torque request 23 |
| 214 | EBCM controls the friction braking command 27 by an amount corresponding to a difference between the braking torque request 13 and the regenerative braking torque request 23 |
| 216 | Execute torque security operation 34 |

The blended braking control scheme 200 operates as follows. The regenerative braking capacity 21 of the vehicle 100 is determined in the HCP 10 (202), and is a measure of regenerative braking torque that the vehicle 100 is capable of achieving. The regenerative braking torque describes magnitude of output torque that may be generated by the torque machine(s) 30 in the form of reactive torque. The regenerative braking capacity 21 includes reactive torque capacity of the torque machine 30, and takes into account a torque capacity of the torque machine 30, limitations of torque transfer clutches and other elements, torque contributions from other driveline components and power storage capacity of the power storage device 32. By way of example, a regenerative braking capacity achievable by the torque machine 30 may be relatively high, but the reported regenerative braking capacity 21 may be limited because the power storage capacity of the power storage device 32 is at or near a maximum value and there is a limited amount of available power storage capacity.

The HCP 10 periodically communicates the regenerative braking capacity 21 from the HCP 10 to the EBCM 20 (204).

The EBCM 20 ongoingly monitors the brake pedal 12 to detect and respond to operator requests for total braking torque in the form of a braking torque request 13 (206). The HCP 10 ongoingly monitors the accelerator pedal 14 and the brake pedal 12 to detect and respond to operator requests for the net torque request 31 that include the braking torque in the form of the braking torque request 13 and the acceleration torque in the form of the acceleration torque request 15.

When a braking torque request 13 is detected, the EBCM 20 initially commands the friction brake system 42 to apply friction braking torque by generating braking torque commands 27 and 29, which are communicated to and immediately applied to the friction braking devices at the drive wheel(s) 40 and the non-drive wheel(s) 41, respectively (208). The braking torque commands 27 and 29 are initially set equal to the braking torque request 13.

The EBCM 20 also generates a regenerative braking torque request 23, which is preferably the smaller magnitude of the braking torque request 13 and the present regenerative braking capacity 21. The EBCM 20 communicates the regenerative braking torque request 23 to the HCP 10 (210). This step eliminates a need to determine a magnitude of regenerative braking torque presently being applied by the torque machine 30 and reduces system latency associated therewith.

The HCP 10 generates a torque command 25 for controlling operation of the torque machine 30 to generate regenerative braking torque in response to the regenerative braking torque request 23 (212).

As the torque machine 30 applies regenerative braking torque in response to the torque command 25, the EBCM 20 reduces the magnitude of the friction braking torque 27 by an amount corresponding to a difference between the braking torque request 13 and the regenerative braking torque request 23, thus effecting the blended braking (214). The EBCM 20 has no direct information related to the magnitude of presently applied regenerative braking torque, but the regenerative braking torque request 23 corresponds to an expected increase in the regenerative braking torque output from the torque machine 30 that is associated with the torque command 25. This effect of system latencies and corresponding braking control issues associated with communicating signals between EBCM 20 and the HCP 10 to control regenerative braking torque output from the torque machine 30 is reduced by using the present regenerative braking capacity 21 in the EBCM 20 to determine the regenerative braking torque request 23.

The blended braking control scheme 200 is iteratively and periodically executed at predetermined timesteps, e.g., the aforementioned loop cycles executed at regular intervals. The blended braking control scheme 200 uses present states for each of the braking torque request 13, the regenerative braking capacity 21, the friction braking torque 27, the regenerative braking torque request 23, and the torque command 25 during each iteration.

The torque security operation 34 executes at the end of each iteration of the blended braking control scheme 200 to secure the torque commands generated thereby (216). Details associated with the torque security operation 34 are described with reference to FIG. 4.

Figure 3:
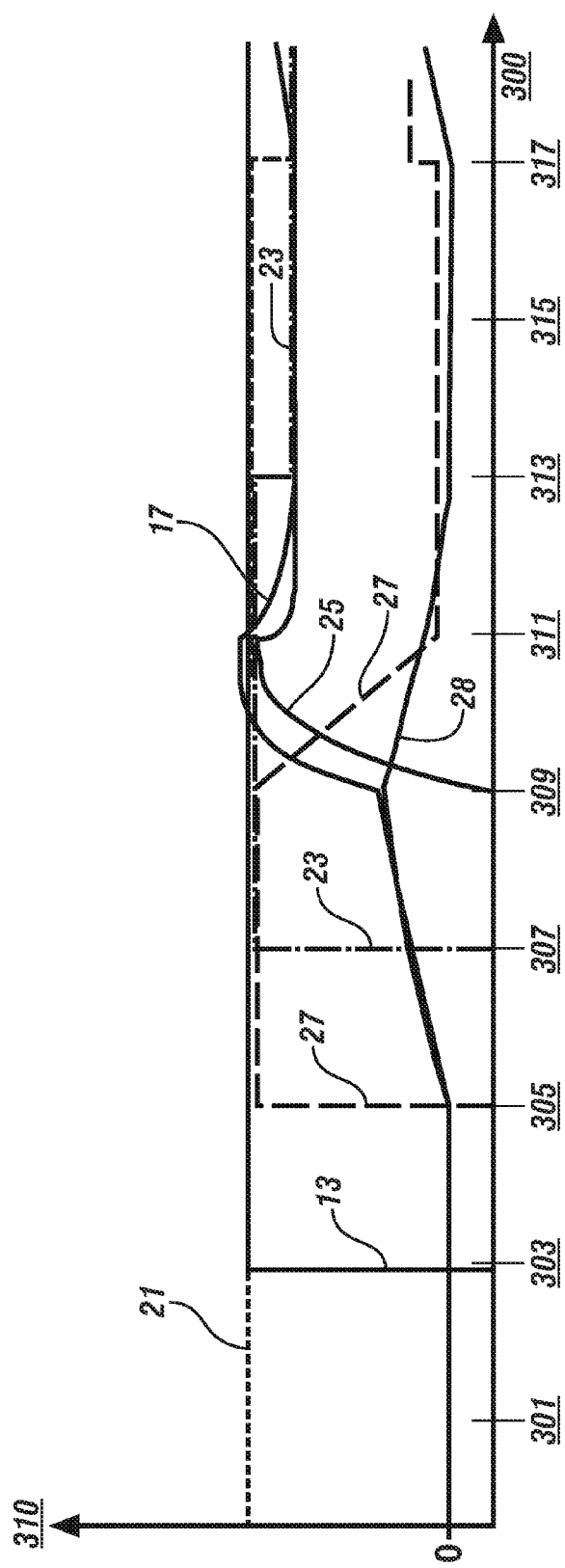
FIG. 3 graphically shows operation of the blended braking control scheme operating on a vehicle system, in accordance with the disclosure.

FIG. 3 graphically illustrates operation of the blended braking control scheme 200 described with reference to FIG. 2, operating on a vehicle system such as has been described with reference to FIG. 1. The graphical depiction includes elapsed time on the x-axis 300 and torque magnitude on the y-axis 310. The elapsed time on the x-axis 300 is divided into periodically occurring timesteps 301 through 317 that depict progression of time and corresponding actions by the EBCM 20 and the HCP 10, and depict latencies associated with executing algorithms and communicating signals. In one embodiment the elapsed time associated with the timesteps is 10 ms.

The regenerative braking capacity 21 is regularly and periodically generated by the HCP 10 and reported to the EBCM 20. A braking torque request 13 in ongoingly monitored.

A positive braking torque request 13 is detected at timestep 303, indicating an operator torque request for braking. As shown, the braking torque request 13 is equal to the regenerative braking capacity 21.

The EBCM 20 commands a magnitude of friction braking torque 27 equal to the braking torque request 13 at subsequent timestep 305 in response to the braking torque request 13. There may be latencies associated with communications between the EBCM 20 and the HCP 10 that results in a delayed response from the HCP 10 to control the torque machine 30. A total achieved braking torque 17 is depicted, and includes a combination of achieved friction brake torque 28 and the torque command 25 to control the torque machine 30 to operate in the electric power-generating mode to react torque. Initially the total achieved braking torque 17 is completely a result of the achieved friction brake torque 28. The achieved friction brake torque 28 is immediately applied by the EBCM 20 and increases, albeit with a time-rate delay in the application of the friction braking torque 27 due to mechanical system latencies. The blended braking control scheme 200 presumes that the torque command 25 for controlling the torque machine 30 is equal to an achieved torque output for the torque machine 30 when applied.

The EBCM 20 communicates the regenerative braking torque request 23 to the HCP 10 at timestep 305, with the regenerative braking torque request 23 equal to the braking torque request 13 and limited to a maximum value determined by the regenerative braking capacity 21.

The HCP 10 receives the regenerative braking torque request 23 at timestep 307, which it processes into commands for operating the torque machine 30 to operate in the electric power-generating mode to react torque in response.

The HCP 10 begins implementing the torque command 25 in response to the regenerative braking torque request 23 at timestep 309, which includes commanding the torque machine 30 to operate in the electric power-generating mode to react torque in response to the torque command 25. The EBCM 20 begins to reduce the magnitude of the friction braking torque 27 by an amount corresponding to an expected increase in regenerative braking torque associated with the torque command 25. As such, the achieved braking torque 17 is made up of the achieved friction brake torque 28 and the torque command 25 and is responsive to the braking torque request 13.

At timestep 311, the achieved braking torque 17 is substantially equal to the braking torque request 13, within permissible error.

Under ongoing operation, the regenerative braking capacity 21 may change, e.g., due to circumstances associated with a state of charge of the high-voltage battery. This is shown beginning at timestep 311.

At timestep 311, the regenerative braking capacity 21 reduces, with the braking torque request 13 unchanged. The HCP 10 responds by immediately and correspondingly reducing the torque command 25. The regenerative braking torque request 23, which is preferably the lesser/smaller magnitude of the braking torque request 13 and the regenerative braking capacity 21, is reduced to the regenerative braking capacity 21.

At timestep 313 the reduction in the regenerative braking capacity 21 is communicated to the EBCM 20.

At timestep 315 the reduction in the regenerative braking capacity 21 is received by the EBCM 20.

At timestep 317 the EBCM 20 becomes aware that the regenerative braking capacity 21 has reduced and thus the associated regenerative braking torque request being implemented by the HCP 10 is correspondingly reduced. Thus, the EBCM 20 increases the friction braking torque 27 in response to the reduction in the regenerative braking capacity 21 to increase the achieved braking torque 17 responsive to the braking torque request 13.

Thus, the blended braking control scheme 200 is responsive to the braking torque request 13 and effectively employs regenerative braking to maximize electric power recovery and respond to limitations of the operating system.

The torque security operation 34 oversees operation of the blended braking control scheme 200 by securing the torque commands generated thereby. The torque security operation 34 is executed to verify that a combination of the torque commands including the braking torque commands 27 and 29, the torque command 25 for the torque machine 30, and torque commands for other torque-generative devices of the powertrain system 100 is responsive to the net torque request 31 communicated via both the brake pedal 12 and the accelerator pedal 14. The torque security operation 34 verifies that the combination of the torque commands is responsive to the net torque request 31 by verifying that the combination of the aforementioned torque commands are within a calculated range of the net torque request 31 during ongoing operation. The calculated range of the net torque request 31 is determined in relation to the present operation of the powertrain system 100 as is described with reference to FIG. 4. The torque security operation 34 conveys signals to the HCP 10 and the EBCM 20, which are configured to execute suitable remedial action when the combination of the torque commands deviate outside of one of the calculated ranges of the net torque request 31.

Thus, the blended braking control scheme 200 as overseen by the torque security operation 34 is responsive to the braking torque request 13, employs regenerative braking to maximize electric power recovery and respond to limitations of the operating system, verifies that the torque commands that are included in the net torque request 31 do not deviate outside of one of the calculated ranges of the net torque request 31.

Figure 4:
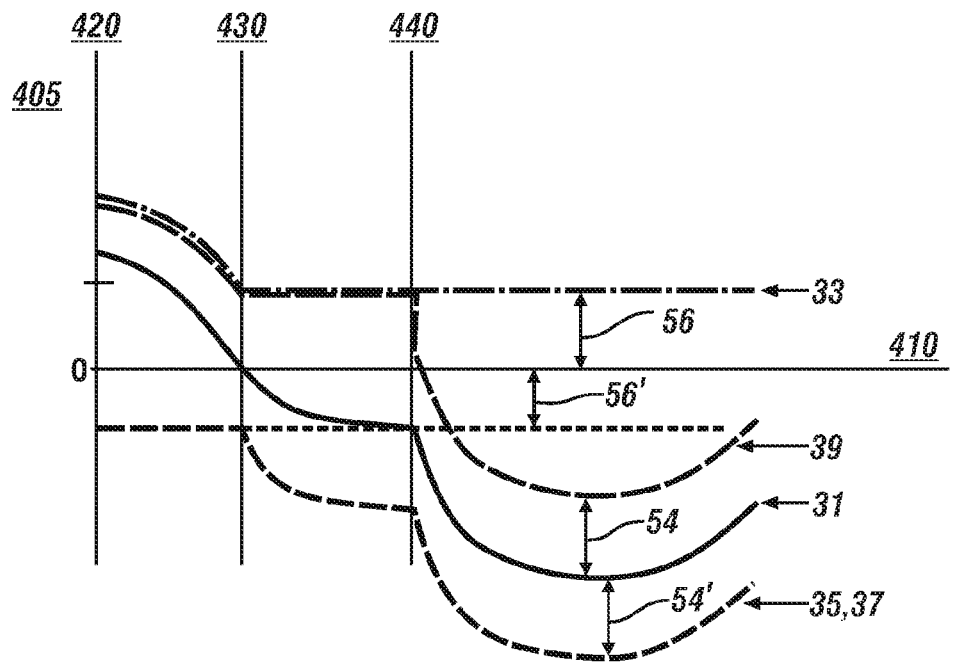
FIG. 4 graphically shows output torque values associated with a torque security operation for a blended braking control scheme, in accordance with the disclosure.

FIG. 4 graphically shows the torque security operation 34, depicting output torque values that are described with reference to FIG. 1 that circumscribe the net torque request (To_net) 31. The x-axis (405) depicts positive and negative torque values, and the y-axis (410) depicts elapsed time.

When the net torque request (To_net) 31 is greater than zero positive torque, the maximum output torque (To_max) 33 is preferably determined in relation to the net torque request (To_net) 31, and includes a differential allowable positive torque security threshold $\Delta T$ 54, as follows.

$$\text{To\_max} = \text{To\_Net} + \Delta T \quad [1]$$

The differential allowable positive torque security threshold $\Delta T$ 54 may equal 0.2 g in one embodiment.

When the net torque request (To_net) 31 is greater than the zero positive torque, the minimum output torque (To_min) 35 is preferably an absolute allowable torque value T' 56', and is determined as follows.

$$\text{To\_min} = T' \quad [2]$$

The absolute allowable torque value T' 56' may equal to 0.2 g in one embodiment.

The maximum output torque (To_max) 33 and the minimum output torque (To_min) 35 when net torque request (To_net) 31 is greater than zero are depicted between timelines 420 and 430.

When the net torque request (To_net) 31 is less than or equal to zero positive torque, the maximum output torque (To_max) 33 is preferably an absolute allowable torque value T 56 and is determined as follows.

$$\text{To\_max} = T \quad [3]$$

The absolute allowable positive torque security threshold T 56 may equal to +0.2 g in one embodiment.

When the net torque request (To_net) 31 is less than or equal to zero positive torque and the torque command 30 does not includes a regenerative braking command, the minimum output torque (To_min) 35 is preferably determined in relation to the net torque request (To_net) 31. The minimum output torque (To_min) 35 is determined in relation to the net torque request (To_net) 31 and includes a differential allowable negative torque security threshold $\Delta T'$ 54', as follows.

$$\text{To\_min} = \text{To\_Net} - \Delta T' \quad [4]$$

The differential allowable negative torque security threshold $\Delta T'$ 54' may equal to 0.2 g in one embodiment. The maximum output torque (To_max) 33 and the minimum output torque (To_min) 35 when net torque request (To_net) 31 is less than zero are depicted between timelines 430 and 440.

When the net torque request (To_net) 31 is less than or equal to zero positive torque and the torque command 30 includes a regenerative braking command, the maximum output torque during regenerative braking (To_max_regen) 39 is determined in relation to the net torque request (To_net) 31, as follows.

$$\text{To\_max\_regen} = \text{To\_Net} + \Delta T \quad [5]$$

The allowable positive torque security threshold $\Delta T$ 54 is a differential torque value, and may equal to 0.2 g in one embodiment.

The minimum output torque during regenerative braking (To_min_regen) 37 is determined in relation to the net torque request (To_net) 31 in the same manner as when regenerative braking is not occurring when the net torque request (To_net) 31 is less than 0. When the net torque request (To_net) 31 is less than or equal to zero positive torque and the torque command 30 includes a regenerative braking command, the minimum output torque during regenerative braking (To_min_regen) 37 is determined in relation to the net torque request (To_net) 31, as follows.

$$\text{To\_min\_regen} = \text{To\_Net} - \Delta T' \quad [6]$$

The allowable negative torque security threshold $\Delta T'$ 54' is a differential torque value, and may equal to 0.2 g in one embodiment.

The maximum output torque during regenerative braking (To_max_regen) 39 and the minimum output torque during regenerative braking (To_min_regen) 37 as depicted after timeline 440.

Thus, the torque security operation 34 defines allowable torque windows in relation to the net torque request 31, including when the net torque request (To_net) 31 is greater than zero positive torque, the net torque request (To_net) 31 is less than zero positive torque, and during regenerative braking operation.

Thus the blended braking control scheme 200, as overseen by the torque security operation 34 is responsive to the braking torque request 13, employs regenerative braking to maximize electric power recovery and responds to limitations of the operating system, and ensures that the torque commands are included in the net torque request 31. The blended braking control scheme 200 as overseen by the torque security operation 34 accommodates time-shifted changes in the various signals that may be due to system latencies associated with communications and mechanical responsiveness of the various actuators.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a powertrain system including a torque machine coupled to a drive wheel of a vehicle, the method comprising:
   determining a regenerative braking capacity of the powertrain system; and
   in response to a net operator torque request including a braking torque request:
      generating a friction braking torque command to operate a friction brake system and coincidentally generating a regenerative braking torque request for the torque machine;
      generating a torque command for controlling operation of the torque machine in response to the regenerative braking torque request; and
      adjusting the friction braking torque command by an amount corresponding to a difference between the braking torque request and the regenerative braking torque request.

2. The method of claim 1, wherein generating the regenerative braking torque request for the torque machine comprises selecting a lesser one of the braking torque request and the regenerative braking capacity.

3. The method of claim 2, wherein selecting the lesser one of the braking torque request and the regenerative braking capacity comprises selecting one of the braking torque request and a present state of the regenerative braking capacity having a lesser magnitude.

4. The method of claim 1, wherein generating the torque command for controlling operation of the torque machine in response to the regenerative braking torque request comprises generating the torque command to apply regenerative braking torque in response to the regenerative braking torque request.

5. The method of claim 1, wherein generating the friction braking torque command to operate the friction brake system comprises generating a friction braking torque command that is equal to the braking torque request.

6. The method of claim 1, wherein adjusting the friction braking torque command comprises subsequently reducing the friction braking torque command by an amount corresponding to a difference between the braking torque request and a subsequently updated regenerative braking torque request.

7. The method of claim 1, further comprising verifying that a combination of the torque commands, including the friction braking torque command and the torque command for controlling operation of the torque machine, is responsive to the net operator torque request.

8. The method of claim 7, further comprising verifying that the combination of the torque commands is within an allowable torque window defined in relation to the net operator torque request.

9. The method of claim 8, wherein the allowable torque window defined in relation to the net operator torque request comprises differential torque values including an allowable negative torque security threshold and an allowable positive torque security threshold.

10. Method for controlling regenerative braking torque in a vehicle including a friction brake system and a powertrain system having a torque machine configured to generate and react tractive torque at a drive wheel of the vehicle, the method comprising:
    determining a regenerative braking capacity of the powertrain system; and
    in response to a net operator torque request including an operator braking torque request:
       generating a regenerative braking torque request for the torque machine, the regenerative braking torque request comprising a lesser one of the operator braking torque request and the regenerative braking capacity;
       generating a torque command for controlling operation of the torque machine in response to the regenerative braking torque request;
       controlling the torque machine to react tractive torque in response to the regenerative braking torque request, the reacted tractive torque equal to the regenerative braking torque request; and
       commanding a friction braking torque corresponding to a difference between the operator braking torque request and the regenerative braking torque request.

11. The method of claim 10, wherein the regenerative braking torque request comprises one of the operator braking torque request and a present state of the regenerative braking capacity having a lesser magnitude.

12. The method of claim 10, wherein generating the torque command comprises generating the torque command to control the torque machine to apply regenerative braking torque in response to the regenerative braking torque request.

13. The method of claim 10, further comprising verifying that a combination of the torque commands, including the friction braking torque and the torque command for controlling operation of the torque machine in response to the regenerative braking torque request, is responsive to the net operator torque request.

14. The method of claim 13, further comprising verifying that the combination of the torque commands is within an allowable torque window defined in relation to the net operator torque request.

15. The method of claim 14, wherein the allowable torque window defined in relation to the net operator torque request comprises differential torque values including an allowable negative torque security threshold and an allowable positive torque security threshold.

16. Method for operating a powertrain system to control regenerative braking torque in a vehicle, the method comprising:
    determining a regenerative braking capacity of the powertrain system;
    monitoring an operator torque request; and
    in response to an operator torque request that includes an operator braking torque request:
       generating a regenerative braking torque request for operating a torque machine configured to transfer and react tractive torque at a driven wheel of the vehicle, the regenerative braking torque request comprising a lesser one of the operator braking torque request and the regenerative braking capacity;

generating a torque command for operating the torque machine in response to the regenerative braking torque request;

controlling the torque machine in response to the regenerative braking torque request; and commanding a friction braking torque corresponding to a difference between the operator braking torque request and the regenerative braking torque request.

17. The method of claim 16, further comprising verifying that a combination of the torque commands, including the friction braking torque and the torque command for operating the torque machine in response to the regenerative braking torque request, is responsive to the operator torque request including the operator braking torque request.

* * * * *